Nov. 27, 1934.　　　　C. W. SPOHR　　　　1,982,079
TEMPERATURE CONTROLLED VEHICLE
Filed July 5, 1932　　　8 Sheets-Sheet 1
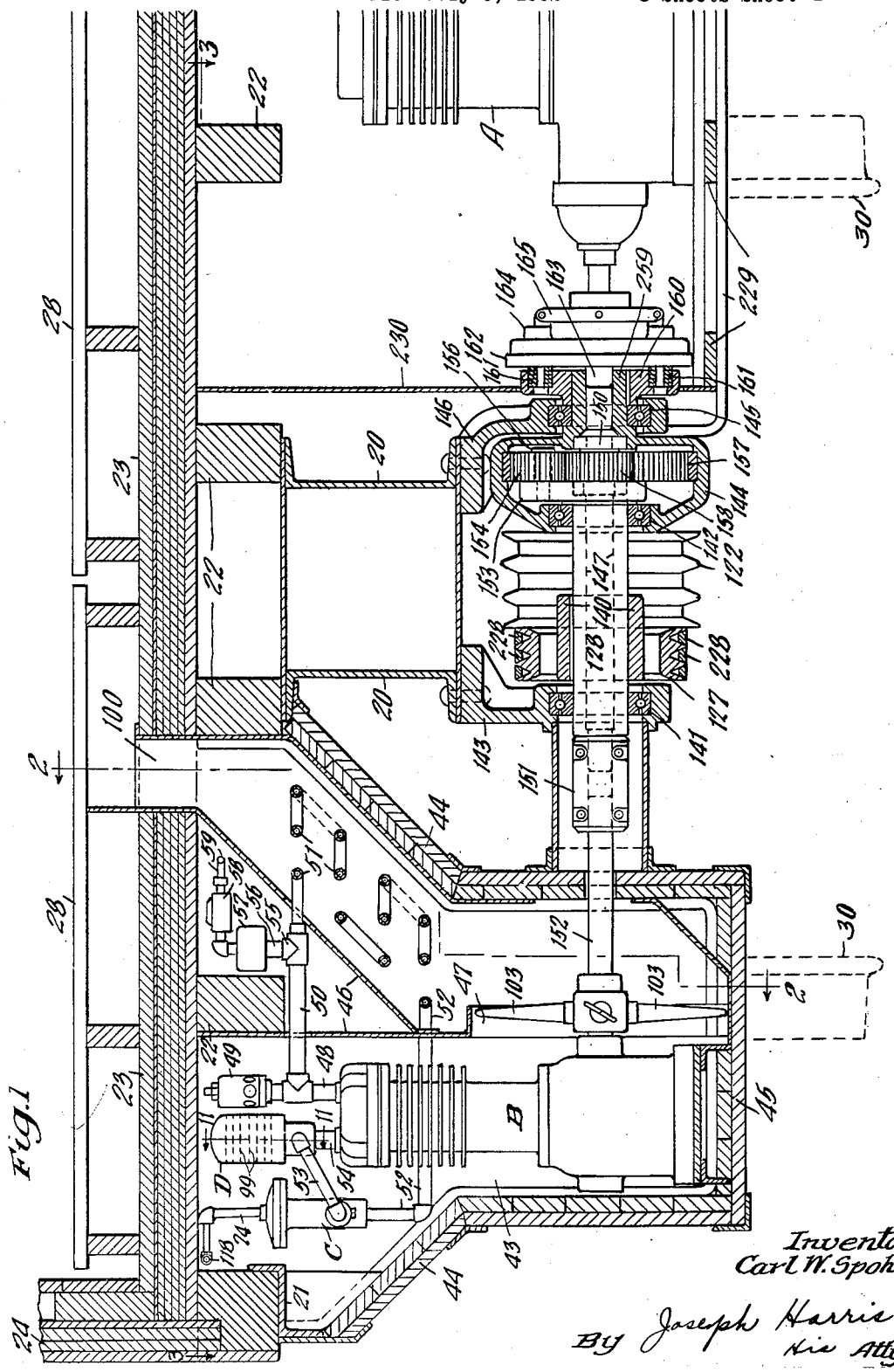
Inventor
Carl W. Spohr
By Joseph Harris
His Atty.

Nov. 27, 1934.  C. W. SPOHR  1,982,079
TEMPERATURE CONTROLLED VEHICLE
Filed July 5, 1932  8 Sheets-Sheet 2
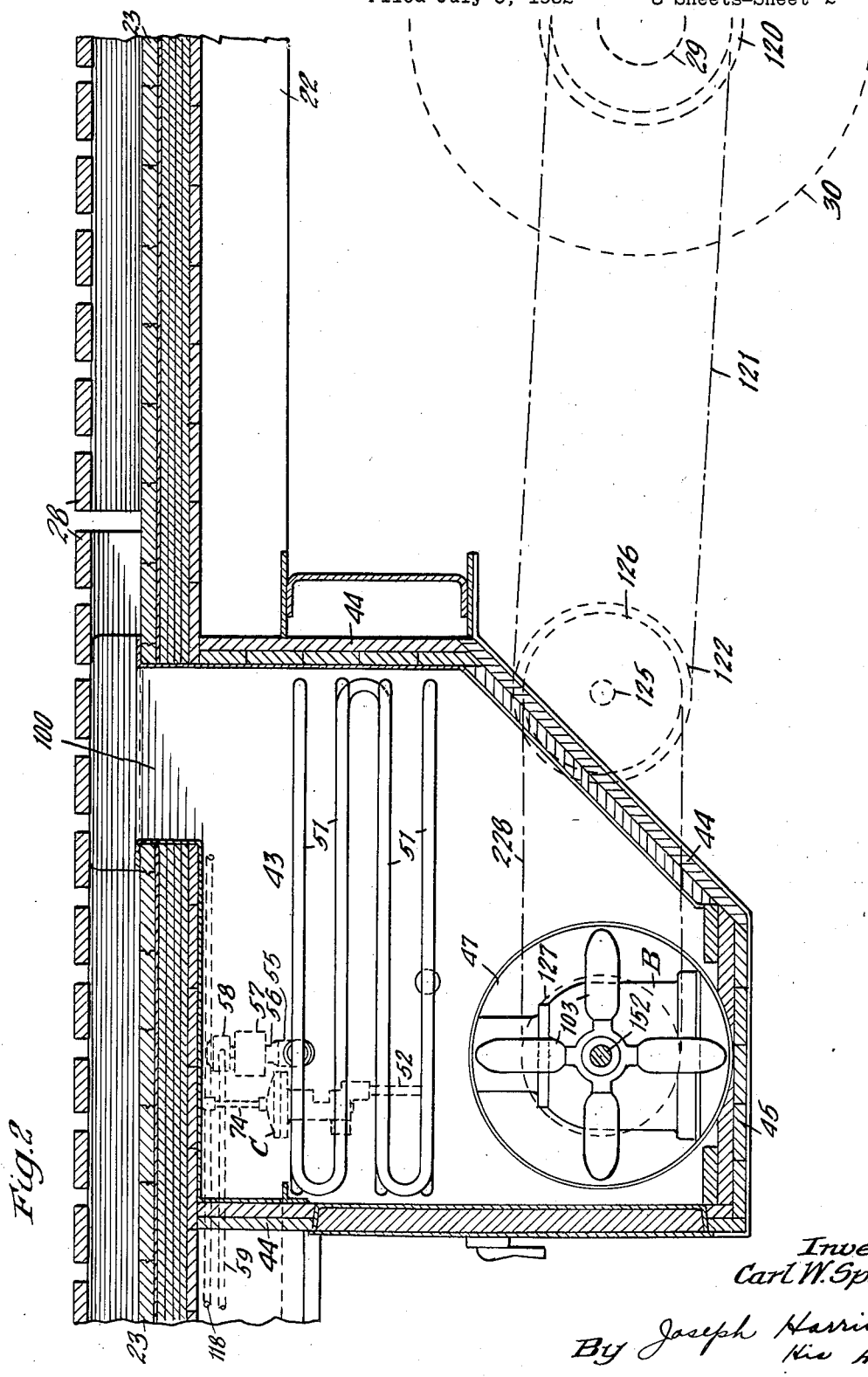
Inventor
Carl W. Spohr
By Joseph Harris
His Atty.

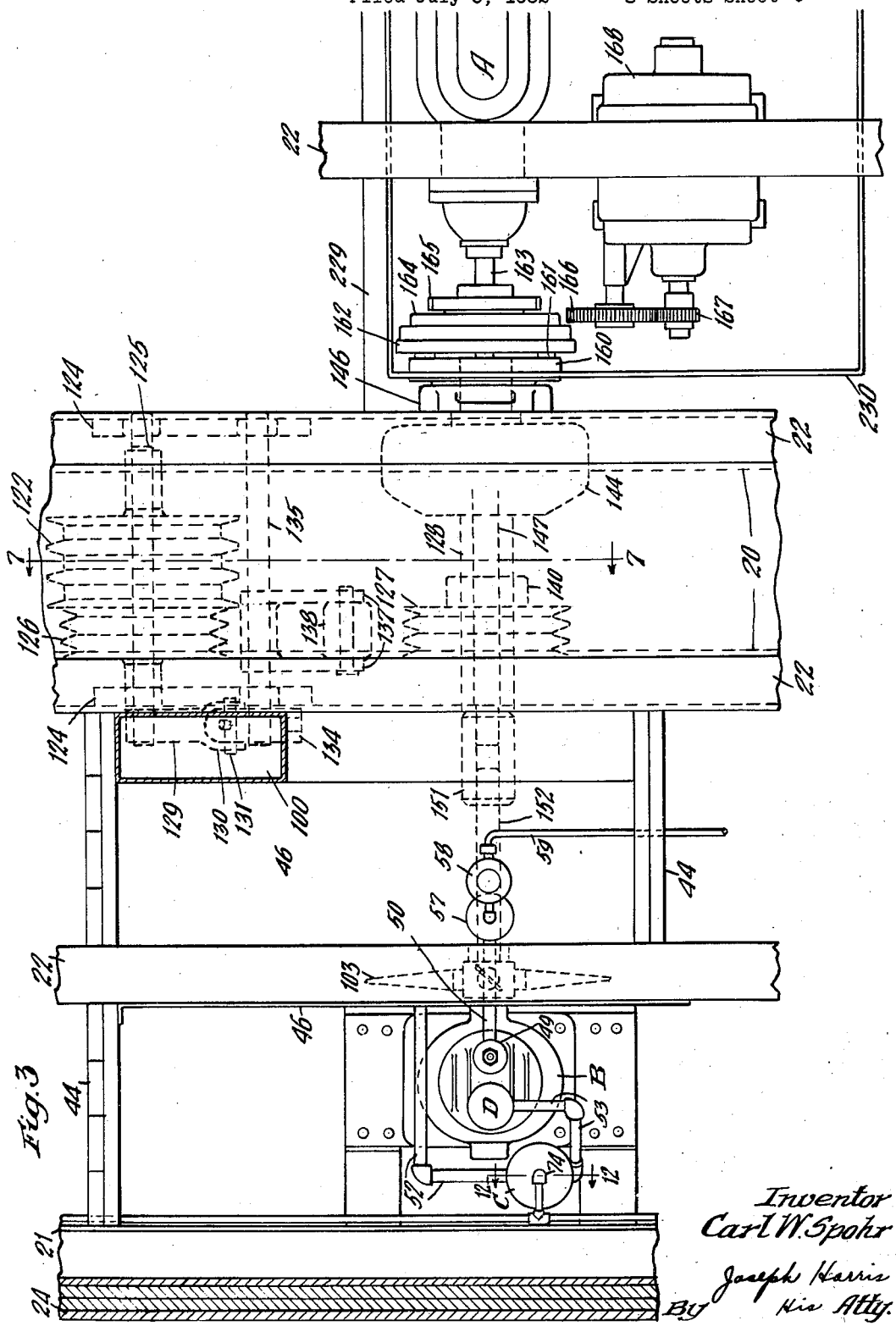

Nov. 27, 1934.  C. W. SPOHR  1,982,079
TEMPERATURE CONTROLLED VEHICLE
Filed July 5, 1932  8 Sheets-Sheet 4
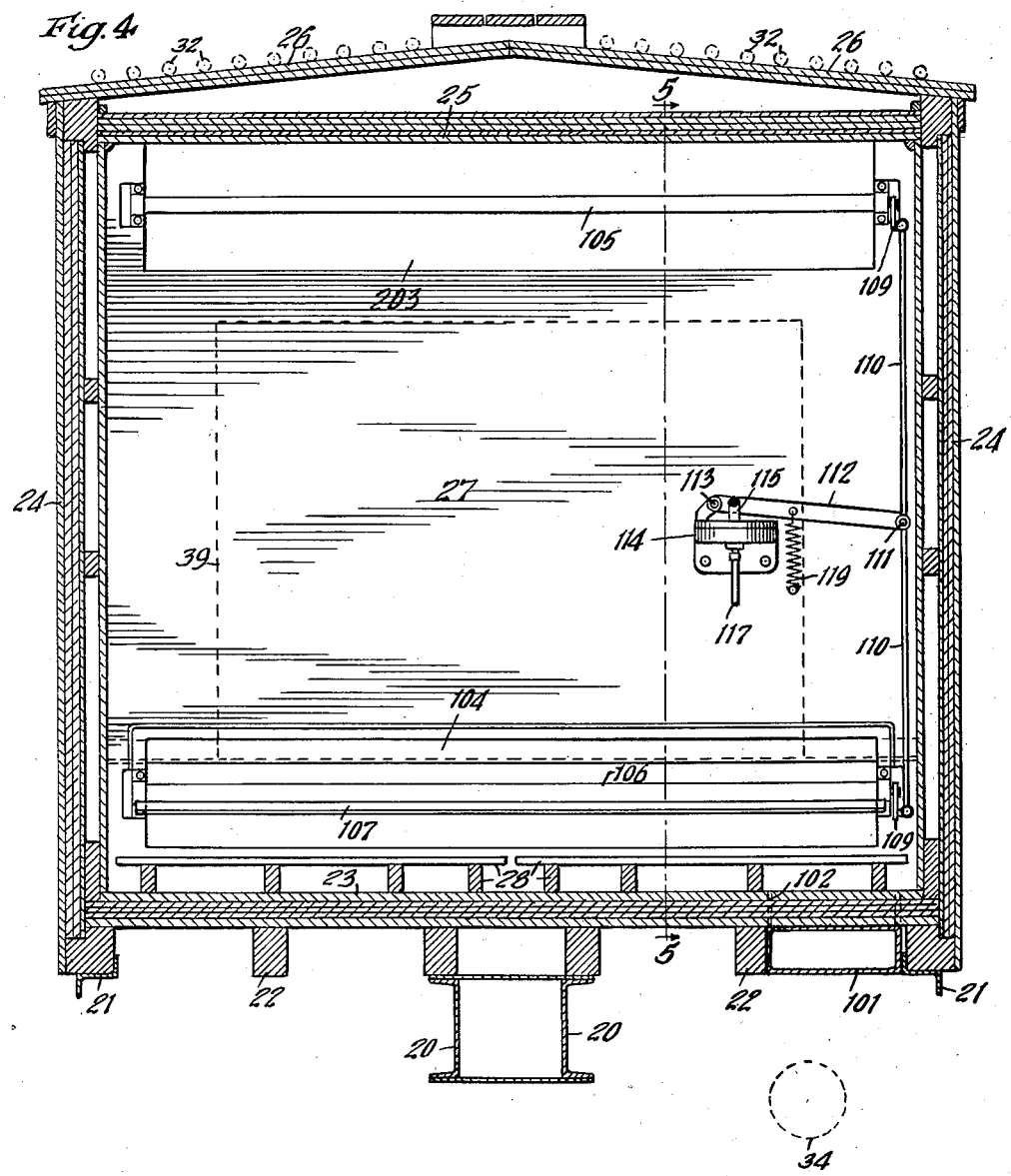
Inventor
Carl W. Spohr
By Joseph Harris
His Atty.

Nov. 27, 1934.  C. W. SPOHR  1,982,079
TEMPERATURE CONTROLLED VEHICLE
Filed July 5, 1932  8 Sheets-Sheet 5
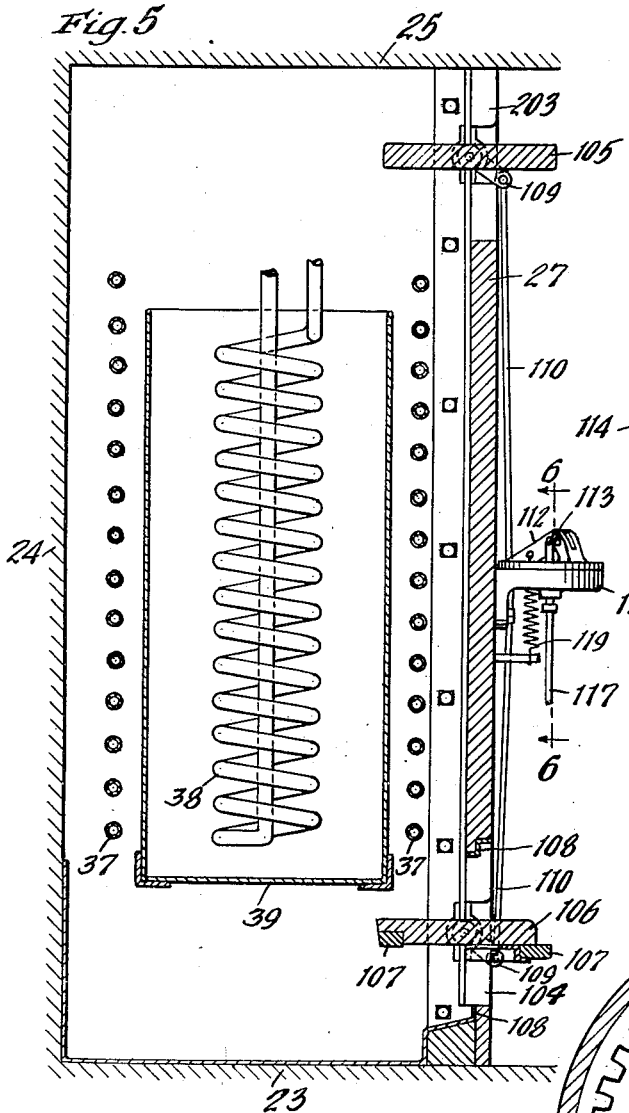
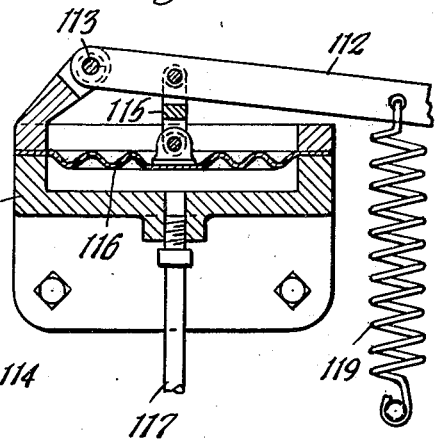
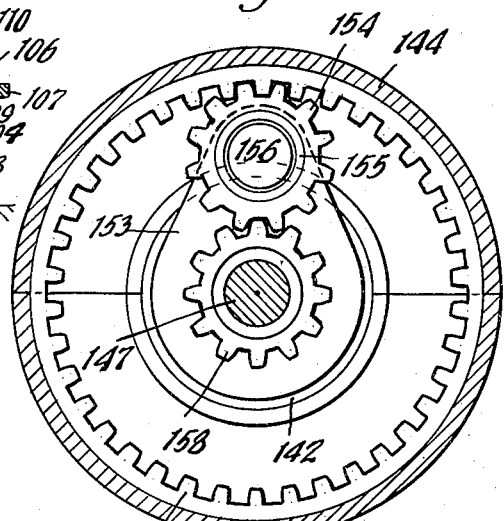
Inventor
Carl W. Spohr
By Joseph Harris
His Atty.

Nov. 27, 1934.                C. W. SPOHR                1,982,079
                        TEMPERATURE CONTROLLED VEHICLE
                        Filed July 5, 1932        8 Sheets-Sheet 6
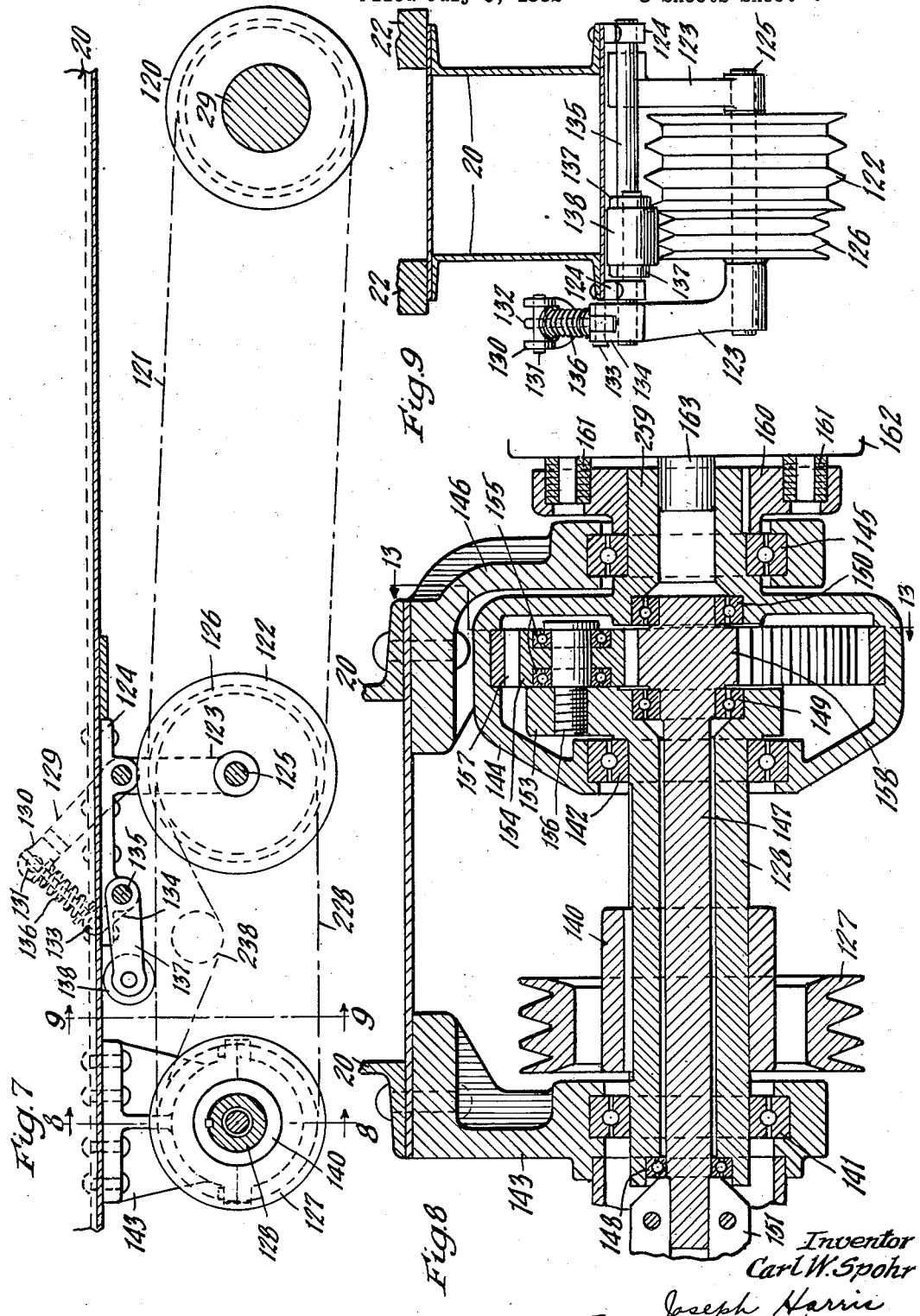

Nov. 27, 1934.     C. W. SPOHR     1,982,079
TEMPERATURE CONTROLLED VEHICLE
Filed July 5, 1932      8 Sheets-Sheet 7
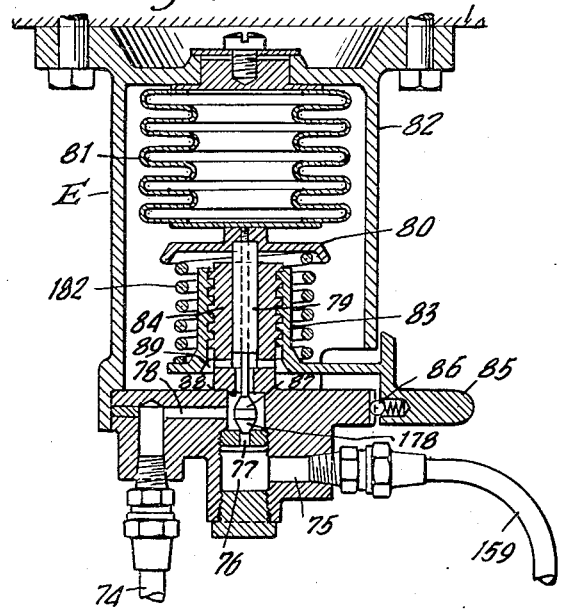
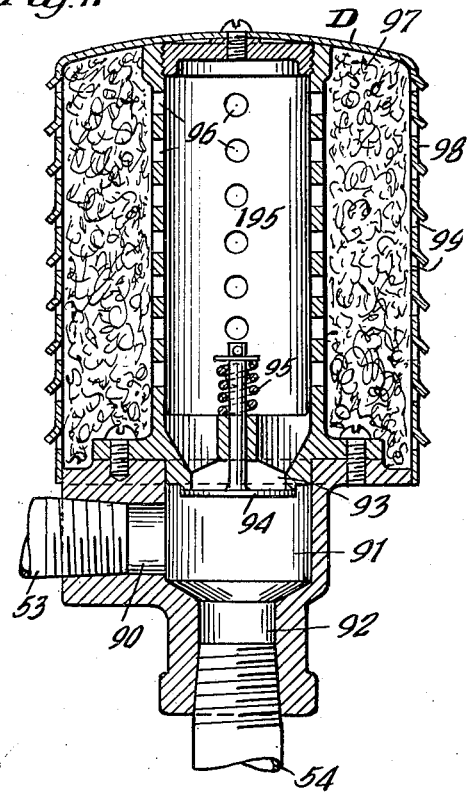
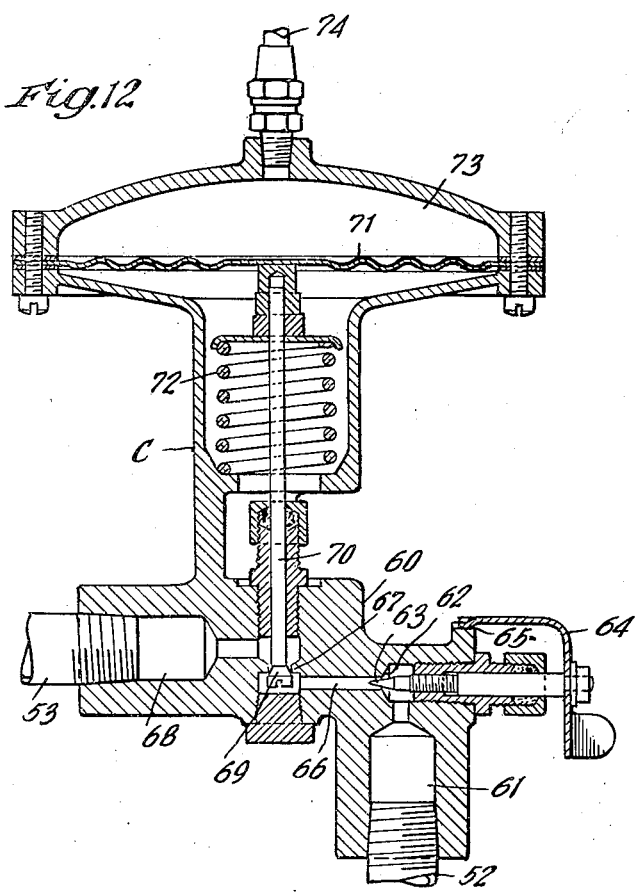
Inventor
Carl W. Spohr
By Joseph Harris
his Atty.

Nov. 27, 1934.            C. W. SPOHR                1,982,079
                  TEMPERATURE CONTROLLED VEHICLE
                      Filed July 5, 1932        8 Sheets-Sheet 8
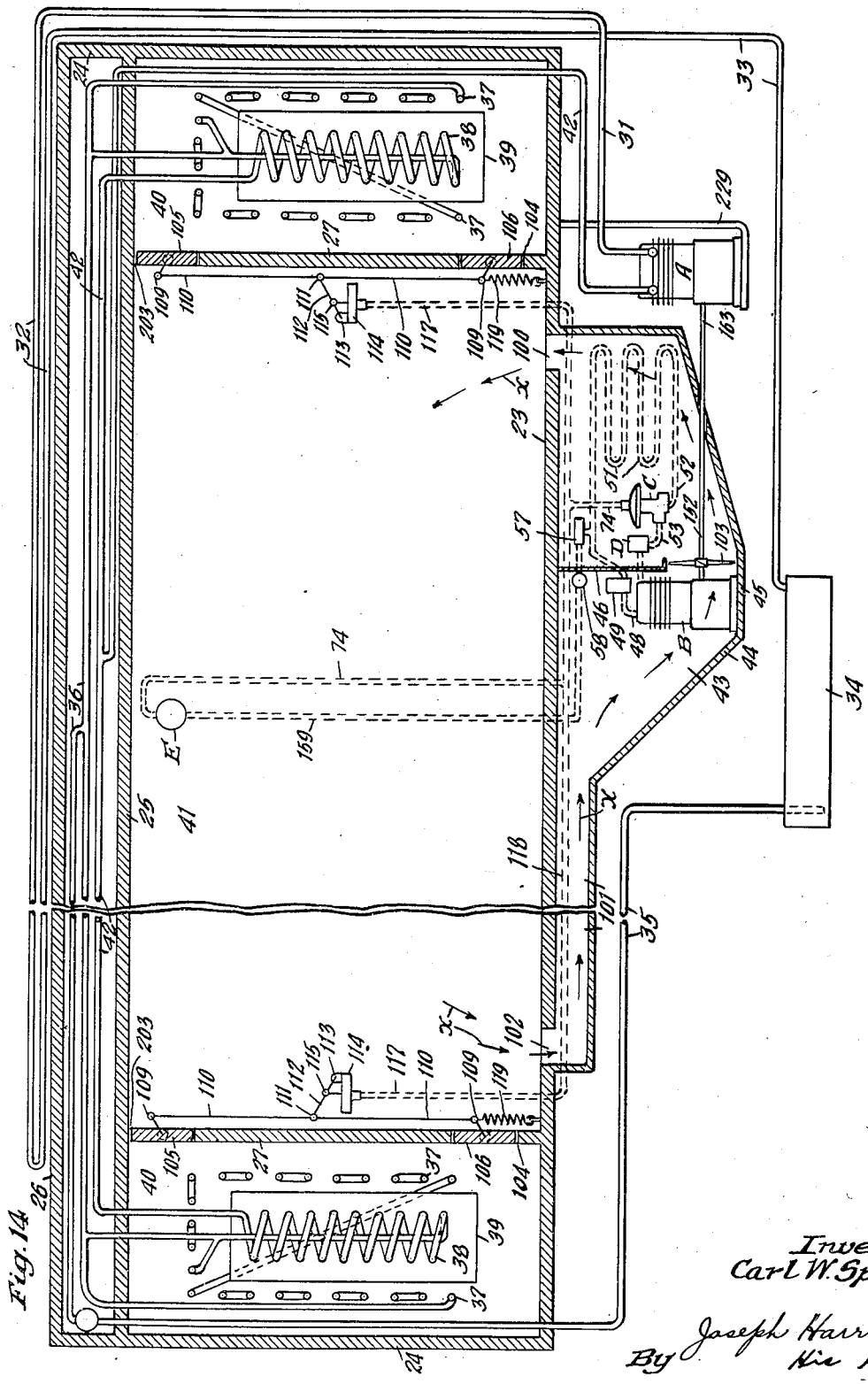
Inventor
Carl W. Spohr
By Joseph Harris
His Atty.

Patented Nov. 27, 1934

1,982,079

UNITED STATES PATENT OFFICE 1,982,079

TEMPERATURE CONTROLLED VEHICLE

Carl W. Spohr, Chicago, Ill., assignor to Mechanical Refrigerated Car Company, Chicago, Ill., a corporation of Illinois Application July 5, 1932, Serial No. 620,774

10 Claims. (Cl. 257—7)

This invention relates to improvements in temperature controlled vehicles and more especially but not exclusively, refrigerator cars.

As well known, a great deal of difficulty has always been experienced in controlling the temperatures of payload compartments of refrigerator cars and the inability to control the temperatures under the wide variations of conditions encountered in transporting perishable goods from one part of the country to another, results in annual heavy claims against the railroads for spoilage. In recent years, considerable progress has been made in overcoming the difficulty above mentioned by the development of mechanical refrigeration for cars to replace the old icing methods. While some of the mechanical refrigerating methods are giving satisfactory results from the purely refrigerating standpoint, nevertheless they do not provide the necessary control for certain extreme conditions of cold which must be met and when heat rather than cold is necessary to prevent freezing of the perishable products. While it has heretofore been suggested to provide means for heating refrigerator cars in conjunction with refrigerating means, such prior suggestions, generally involve the use of electricity as the source of heat, the electrical energy being obtained either by utilizing an axle driven generator or from a storage battery. Electrical means of heating are relatively expensive, not only in first cost but in maintenance and hence present certain objections for these reasons.

One object of this invention is to provide a combination of cooling and heating means simple and economical to install and requiring a minimum of servicing, by which the temperature of the payload compartment of a refrigerator car or other revenue-producing compartment of other railway cars and vehicles, may be automatically controlled within predetermined limits and wherein the heat generated is obtained through mechanical means as distinguished from any electrical means.

In the case of those mechanically refrigerated cars employing an axle driven compressor, another source of difficulty has heretofore arisen because of the sudden excessive loads frequently placed on the driving means between the car axle and compressor, which occasionally causes a breakdown. Such abnormal conditions may occur when starting the car after a period of rest and at which time some of the refrigerant may have condensed or collected in liquid form in the compressor, thereby producing an abnormally heavy resistance to starting up of the compressor.

Another object of this invention, therefore, is to provide a compensatory arrangement associated with an axle driven refrigerant compressor of a railway car such that any abnormal condition opposing the normal starting or functioning of such compressor will be automatically taken care of; excessive stresses on the axle driven means avoided; and the refrigerating compressor allowed to gradually ease into normal operation as the car gathers speed.

Another object of the invention is to utilize heat generated by compressing air for heating the air of the payload or revenue-producing compartment of the vehicle whenever heat is desired.

A further object of the invention is to provide, in connection with a vehicle such as a railway car, combined and inter-related refrigerating and air compressor systems, both deriving their power from the moving vehicle, the combination being so arranged that, as the maximum services of one of the systems is required, the other system remains idle or non-functioning and vice versa, with a complete range of variations in the functioning of the two systems between the two extreme conditions referred to.

Another object of the invention is to provide, in a vehicle refrigerating system, means associated with the driving mechanism for the refrigerating compressor in such manner that any abnormal resistance to its starting or continued operation will be automatically compensated for or relieved to such degree as may be necessary and the driving power delivered to a heating system until the abnormal resistance in the refrigerating system is eliminated or gradually overcome and the full power delivered to the refrigerating system.

Still another object of the invention is to provide a refrigerating system of the compressor-condenser-expander type cooperatively associated with a compressed air heating system for vehicles, the arrangement being such that the two systems are automatically governed in their operation, dependent upon the temperature conditions, and in such manner that each system will take such proportion from 0 to maximum of the total power being delivered as will just be necessary to maintain the desired temperature conditions.

Other objects of the invention are to provide in an arrangement of the character indicated in the preceding paragraphs, means for effecting a forced draft of the air through the payload compartment of the vehicle when heat is being delivered; to shut off or restrict air circulation between the refrigerating system and the payload compartment of the vehicle when cooling is not required; to employ automatically operating, compensating differential gearing between the driving car axle on the one hand and the refrigerant and air compressors on the other hand; to minimize the amount of heat exchanged between the interior and exterior of the payload or revenue-producing compartment of the car while the latter is in operation; to utilize air from the compressed air system for actuating the louver or valve controls of the air circulating passages; and to provide for seasonal adjustments of certain of the apparatus.

Other objects of the invention will more clearly appear from the description and claims hereinafter following.

In the drawings, Figure 1 is a vertical, transverse sectional view of a refrigerator car taken between the trucks and looking toward the truck adjacent the compressors and showing the improvements in connection therewith. Figure 2 is a broken, vertical sectional view, taken longitudinally of the car and corresponding substantially to the line 2—2 of Figure 1. Figure 3 is a part horizontal sectional view, part top plan of the structure shown in Figure 1, the section corresponding to the line 3—3 of Figure 1. Figure 4 is a vertical, transverse, sectional view of the car body looking toward one of the bulkheads. Figure 5 is a vertical, detailed sectional view corresponding to the line 5—5 of Figure 4. Figure 6 is a detailed, broken sectional view, illustrating the louver or valve control air motor and corresponding substantially to the line 6—6 of Figure 5. Figure 7 is a vertical sectional view taken lengthwise of the car and corresponding to the line 7—7 of Figure 3. Figure 8 is an enlarged, vertical sectional view of part of the driving mechanism for the compressors and corresponding substantially to the line 8—8 of Figure 7. Figure 9 is a vertical, sectional view corresponding to the line 9—9 of Figure 7. Figure 10 is a detailed vertical sectional view of the thermostatic pilot valve located within the payload compartment. Figure 11 is a vertical, detailed sectional view corresponding to the line 11—11 of Figure 1, illustrating the air intake for the air compressor system. Figure 12 is a detailed vertical, sectional view of the air shut-off valve upon an enlarged scale and corresponding substantially to the line 12—12 of Figure 3. Figure 13 is a vertical detailed sectional view of the planetary gearing and corresponds substantially to the line 13—13 of Figure 8. And Figure 14 is a schematic or diagrammatic view of the refrigerator car illustrating the refrigerating system, air heating system and air circulation systems.

In said drawings, the refrigerator car is shown as having an underframe comprised of channel center sills 20—20, side sills 21—21, stringers 22—22, floor 23, side and end walls 24—24, ceiling 25, roof 26, bulkheads 27 and floor racks 28—28, it being understood that the various walls of the car body are of insulated construction and that the refrigerator car is of the usual design, having two bulkheads, one at each end and provided with the usual side door entrances. The car body will be mounted on trucks in the customary manner, it only being deemed necessary to illustrate the driving car axle indicated at 29, the wheels thereof being indicated at 30—30.

The refrigerating apparatus which is considered preferable and which is shown in the drawings as of the compressor-condenser-expander type with the compressor driven from one of the car axles is, in general, broadly similar to those refrigerating systems disclosed in the Luhr Reissue Patent 17,660 of May 13, 1930, and Luhr pending application, Serial No. 413,713, filed December 13, 1929. It will be understood, however, by those skilled in the art that other types of refrigerating systems may be employed under certain conditions while still utilizing many of the features of the present invention, although the refrigerating apparatus disclosed is considered preferably when used in combination with the air heating system hereinafter described.

The refrigerating apparatus, shown more or less conventionally in the drawings, comprises a refrigerant compressor A driven from the car axle in the manner hereinafter described, said compressor being preferably mounted beneath the car floor on a platform structure 229 suspended from the underframing and within a suitable box or casing 230. From the compressor leads the discharge pipe 31, indicated best in the diagrammatic view of Figure 14, the same conducting the compressed refrigerant to condenser coils 32 preferably located on the roof of the car, the condensed refrigerant then being conducted through pipe 33 to a receiver 34, preferably located beneath the car floor. From the receiver 34, the refrigerant is conveyed by pipe 35 to the top of the car where it is delivered to branch pipes 36—36 leading to each end of the car where the refrigerant is or may be delivered in parallel to outer coils 37—37 and an interior coil 38 disposed within a brine tank 39, which acts as a cold accumulator. As shown in Figure 14, the refrigerant enters the bottom of one outer side coil, passes upwardly therethrough, then enters the bottom of the other outer side coil and passes upwardly and thence through top horizontal coil above the brine tank after which it is conducted to the pipe leading to the bottom of the interior coil 38. In this connection, it will be understood that the cold accumulator tank and refrigerating coils at each end of the car, are located within what may be termed the cooling or refrigerating chamber 40, which is separated from the central payload compartment 41 by the bulkhead 27. The refrigerant, as it expands, ultimately passes upwardly of the inner coil 38 and is then conducted by pipe 42 back to the intake side of the compressor, thus completing the circuit. In the diagrammatic view, the usual reducing valves, thermostatic control valves, etc. have not been deemed necessary of illustration and for a more detailed description of such parts, reference may be had to either said reissue patent or pending application.

The heat generating and radiating system for heating the air from the payload compartment, as shown, is located within what may be termed a heating chamber 43, preferably located below the car floor as shown in Figure 1, which chamber is defined by a suitable box-like, insulated wall structure 44 supported from the underframe and having a bottom supporting wall 45 on which is mounted an air compressor designated generally by the reference character B. The heating chamber 43 is preferably sub-divided into two sub-chambers by a suitable sheet metal partition 46—46 with a communicating opening 47 therebetween. The air compressor B is located in one of the sub-chambers and is driven from one of the car axles preferably in the manner hereinafter described. The compressor B delivers the compressed air through pipe 48 in which is included a safety valve 49 of any suitable construction and set to the proper maximum pressure. The compressed air is conducted through the pipe 50 to a radiating coil 51 located in the other sub-chamber, the return from the coil 51 being through the pipe 52 which has included in it a shut-off or control valve C hereinafter described, and from the control valve C, pipe 53 leads to an air intake valve D, hereinafter described, and the return to the compressor is made through the pipe 54. From the preceding description, it will be seen that the compressor B operates in what may be termed a closed circuit, the operation being automatically controlled as hereinafter described. Included in the pipe 50 between the compressor and the radiating coil 51 is a T 55, from which leads a branch line 56 to an oil trap 57 and from the latter through a reducing valve 58 and from the latter a pipe 59 leads to the thermostatic pilot valve E, hereinafter described.

Referring to Figure 12, the control or shut-off valve for the air compressor B is preferably of the air pressure diaphragm operated type with suitable provision for seasonal adjustments. As shown, the same comprises a main body 60 with an admission port 61 for air entering from the pipe 52; a restricted throttle valve 62 controlled by an adjustable threaded needle valve 63, having a spring clip outer finger piece 64 adapted to adjustably engage and be retained by a notched surface 65 so that by turning the needle valve the area of the throttle opening 62 may be adjusted for different seasonal conditions and left set in any such adjusted position, it being understood that the throttle opening will be reduced for summer and correspondingly enlarged for colder weather conditions. From the throttle opening 62, a port 66 leads to the valve control opening 67, which is in communication with the outlet port 68 through which the compressed air is delivered to the pipe 53 leading back to the compressor. The valve opening 67 is controlled by a tapered valve 69 carried at the lower end of a valve stem 70 attached at its upper end to a flexible diaphragm 71 and normally urged upwardly by an expansion spring 72. The diaphragm 71 is disposed in a chamber 73 and air under pressure is adapted to be admitted to the upper side of the diaphragm, under the conditions hereinafter described, through pipe 74 communicating with the thermostatic pilot valve or air regulator E.

When the temperature within the pay-load compartment of the car is above a predetermined minimum, the valve 69 will remain closed, the condition shown in Figure 12, and hence circulation of the compressed air will be shut off and the air compressor prevented from normally functioning. When, however, the temperature falls to the predetermined minimum or therebelow, compressed air is admitted above the diaphragm 71, the valve 69 is depressed, opening the port 67 and permitting circulation of the compressed air and operation of the compressor B, as will be understood, the needle valve 63 remaining set however and controlling the maximum possible passage of air through the closed circuit, in accordance with the seasonal adjustments.

The pilot valve E operates and functions in the following manner, particular reference being had to Figures 1, 10 and 14. Air under reduced pressure, after passing the reducing valve 58, is conducted through pipe 59 and 159 up to the pilot valve E, which is located at any suitable point in the compartment under temperature control and, preferably, in a refrigerator car will be located near the ceiling at the center of the pay-load compartment. The compressed air under reduced pressure is admitted through port 75 of the pilot valve E, which communicates with passage 76, valve opening 77 and outlet port 78, communicating with the pipe 74 that in turn leads to the diaphragm chamber of the shut-off or control valve C. The valve opening 77 is controlled by a tapered valve 178 carried at the lower end of a stem 79 and which in turn is secured to a plate 80 attached to the bottom of an expansible bellows 81 mounted within the casing 82. The plate 80 is normally urged upwardly by an expansion spring 182, the tension of which is adjustable by means of the sleeve 83 threaded on the post 84, said sleeve being angularly adjustable by means of a radially extending finger piece 85 adapted to be retained in any adjusted position by means of the spring pressed ball 86 cooperating with a series of notches in the base casting, as will be clear. By adjusting the finger piece 85, the pilot valve can be set to operate at the desired minimum temperature. The stem 79 also carries an oppositely disposed conical valve 87 adapted to cooperate with a valve seat 88, which communicates with bleeder or relief openings 89.

When the temperature in the pay-load compartment is above the predetermined minimum, the valve 178 is seated, thus shutting off communication between the inlet port 75 and outlet port 78. When the temperature drops to or below the predetermined minimum, the bellows 81 contracts, thus lifting the valve stem 79, unseating the valve 178 and seating the valve 87 on the valve seat 88. Under this condition, communication is established between the intake port 75 and outlet port 78, as will be understood and, simultaneously, the bleeder ports 89 are shut off by the valve 87. This permits operation of the diaphragm 71 of the shut-off or control valve C, as will be evident, and also permits operation of the damper or louver air motors, hereinafter described. When the temperature of the pay-load compartment has risen above the predetermined minimum for which the pilot valve has been set, the valve 178 is re-seated by expansion of the bellows 81 and the valve 87 is unseated, thus shutting off communication between the ports 75 and 78 and permitting bleeding of the control valve C and damper motors referred to, through the bleeder openings 89.

The air intake valve D has an intake port 90 through which air enters from the pipe 53, a main chamber 91 and an outlet port 92 with which communicates the pipe 54 leading direct to the intake valve of the compressor. The main chamber 91 has an intake port 93 normally closed by valve 94, which is held seated by a spring 95 acting on the stem, as shown. The port 93 communicates with an intake chamber 195 preferably of cylindrical form with a plurality of intake openings 96, the intake chamber or sleeve being surrounded by a layer of metal wool or other suitable air filtering medium 97 and the latter retained by an outside casing 98 having a series of inlet vents 99 punched therein, preferably around the entire circumference. As will be understood, the valve 94 is set so as to remain closed under the desired pressure but when the pressure in the chamber 91 drops below the predetermined minimum, the valve 94 automatically opens under suction and additional air is admitted to the circuit to supply any losses that may have occurred therein during the operation of the air compressor system.

The air circulating and control system is preferably as follows. Referring to Figure 1, from the righthand sub-chamber in which is contained the heating coil 51, leads a passage 100 vertically upward through the floor of the car and communicating with the space beneath the floor racks 28. Communicating with the opposite sub-chamber is a preferably rectangular air duct 101 (see Figure 4) extending lengthwise of the car between the outer pair of stringers and which has an opening 102 extending upwardly through the floor and communicating with the passages between the floor racks 28. The openings 100 and 102 are preferably disposed adjacent the opposite ends of the pay-load compartment 41 so that the air from the payload compartment will enter through one of said openings and be delivered through the other. Practically, the air may enter through either opening and be delivered through the corresponding remaining opening but preferably a reversible vane fan 103 on the driving shaft of the air compressor B will be employed so as to have the circulation always in the same direction, that is, the air from the compartment 41 entering the opening 102, passing along the duct 101, thence downwardly over the compressor B, through the communicating opening 47 and up through and around the heating coil 51 and finally delivered to the pay-load compartment through the opening 100, as best indicated by the arrows x—x in the diagrammatic view, Figure 14. The fan 103 may be of any suitable reversible vane type, the reversing feature being employed because of the fact that the car may run in either direction and hence the compressor shaft may be rotated first in one direction and then in the opposite direction. It is deemed unnecessary to illustrate the details of the reversible fan structure 103.

When the heating system is functioning for heating purposes, it is desirable to shut off air circulation between the refrigerating chambers and the pay-load compartment so that the cooling effect of the refrigerating system is eliminated, at least for all practical purposes and the heating system is required to heat only such air as circulates in the pay-load compartment. To accomplish this result, the following arrangement is employed, it being understood that the arrangements are duplicated at each bulkhead. Referring more particularly to Figures 4, 5 and 6, each bulkhead is provided with an upper opening 203 and a lower opening 104 adapted to be controlled by pivoted louvers or dampers 105 and 106, respectively, said dampers being pivoted to rotate about horizontal axes and of such area as to close the respective openings 203 and 104. The lower damper 106 is preferably provided along its edges with rubber or other resilient strips 107—107 adapted to effect a cushioned closure and sealed opening with the abutment walls 108—108 defining the upper and lower edges of the opening 104. The dampers or valves 105—106 are adapted to be operated in unison and for this purpose each damper is provided at one of its ends with a crank arm 109 to which links 110—110 are connected by preferably ball joints, the links being connected at 111, with a lever 112, which is pivoted at its other end 113 to a compressed air motor 114. Adjacent its fulcrum end 113, the lever 112 has a link 115 pivoted thereto, the opposite end of the link being pivotally connected to a flexible diaphragm 116, the under side of which is subject to compressed air under reduced pressure through the pipe 117 which, through the pipes 118, is in communication with the pipe 74 running between the pilot valve E and the shut-off valve C, as best indicated in Figure 14. In this connection, in Figure 14, all air pipe lines are indicated by dotted lines and the refrigerator system pipes by full lines. The damper motor lever 112 is normally pulled downwardly by a tension spring 119 in such manner as to maintain the dampers 105 and 106 open, as shown in Figure 5. When, however, the temperature in the compartment 41 drops sufficiently to open the pilot valve E, air is admitted to the under sides of the damper motor diaphragms 116 so that the latter are forced upwardly and hence lift the levers 112 against the action of the springs 119, thus effecting closure of the dampers or louvers 105—106 as the heating system is brought into operation. When the temperature rises and the position of the valves in the pilot valve E is reversed, the pipe lines 117 will be bled as apparent from the preceding description, thus permitting the dampers 105 and 106 to resume their open position, shown in Figures 4 and 5. As shown in Figure 5, the damper air motors are preferably mounted on the bulkheads.

The compressors A and B are driven from the car axle 29 in the following manner, particular reference being had to Figures 1, 3, 7, 8, 9 and 13. Secured to the car axle 29, preferably in the longitudinal center line of the car, is a multiple groove pulley 120 over which take a plurality of preferably V-belts 121, said belts being in turn passed around another pulley 122, rotatably journaled on a swinging yoke 123 pivotally suspended from a bracket 124 secured to the underside of the center sill structure. The same shaft 125, which carries the pulley 122, also has secured thereto a second multiple groove pulley 126, which is longitudinally alined with a pulley 127, keyed to shaft 128, supported and operating in the manner hereinafter described. A plurality of V-belts 228 extend between the two pulleys 126 and 127 so that, power from the axle 29, is ultimately delivered to the pulley 127 through the belts 121, pulley 122, pulley 126 and belts 228.

As understood by those skilled in the art, the truck moves angularly and to some extent up and down with respect to the car underframe, thus involving changes in angularity and distance between the pulleys 120 and 122. By using V-belts, the difference in the angular relation between the pulleys 120 and 122 will be automatically taken care of since the V-belts will still ride into the V-grooves of the pulleys even when approaching or leaving the pulleys at an angle within the normal limits of swivelling movements of a car truck. To compensate for the variations in distance between the centers of the pulleys 120 and 122, the following belt tensioning arrangement is preferably employed, particular reference being had to Figures 3, 7 and 9. The yoke 123, at one end thereof, is provided with a preferably integrally formed bell crank lever 129, forked at its outer end, as indicated at 130 to receive a pin 131, through which is slidable one end of a rod 132, the opposite end of which is pivotally connected at 133 to an arm 134 of a bell crank lever pivoted at 135. Mounted on the rod 132 and interposed between the bell crank arms 129 and 134 is a spring 136 normally under initial compression in such manner as to tend to separate or swing oppositely the bell crank arms 129 and 134. Integral or rigid with the bell crank arm 134 is another arm 137, which carries an idler roller 138 engaging with the upper reaches of the belts 228. As will be apparent, the spring 136 tends to push the idler roller 138 down and hence increase the tension on the belts 228 and at the same time tends to separate the pulley 122 from the pulley 120. The ratio of the bell crank arms 129, 134 and 137 is such, however, that any movement imparted to the pulley 122 toward the left as viewed in Figure 7, which will maintain the belts 121 taut and tend to slacken the belts 228, is more than compensated for by the greater downward movement of the idler tensioning roller 138, an extreme position of the roller 138 being indicated by dotted lines at 238. In this manner, whether the pulley 122 is pulled to the right by a shift of the axle pulley 120 or permitted to swing to the left, as viewed in Figure 7, nevertheless both sets of belts are maintained taut under the automatic action of the spring 136.

Referring now to the drives for the two compressors, the pulley 127 has its hub 140 keyed to the hollow shaft 128 as hereinbefore described, particular reference being had to Figures 1 and 8. Said hollow shaft 128 is mounted in suitable anti-friction bearings 141 and 142, the former being supported in a depending bearing bracket 143 secured to the center sill structure. The anti-friction bearing 142 is supported in an internal gear housing 144, which in turn is supported in an anti-friction bearing 145 mounted in another depending bearing bracket 146 also secured to the center sill structure. Within the shaft 128 is rotatably disposed another shaft 147 supported in anti-friction bearings 148, 149 and 150, the anti-friction bearings 148 and 149 being supported by the shaft 128 and the anti-friction bearing 150 being supported within said gearing housing 144. The shaft 147 is rigidly connected by a coupling 151 with the air compressor shaft 152 so that when the shaft 147 is driven, the air compressor B and fan 103 will also be driven.

The shaft 128 is provided with a crank arm 153 operating within the gear housing 144 and on which is carried a pinion 154 mounted on suitable anti-friction bearings 155 supported in turn on the crank pin 156. The pinion 154 meshes with the internal gear 157 fixed to the gear housing 144. The pinion 154 also meshes with a gear 158 on the shaft 147, thus providing a planetary or differential gearing. The gear housing 144 has a hub section 259 to which is secured a disc 160 having a plurality of shock absorbing connections 161 with an internal gear clutch drum 162, freely rotatable on the refrigerant compressor A shaft 163. Cooperable with the gear drum 162 is a gear clutch member 164 shown in the drawings in operative relation with the drum 162, but adapted to be disengaged by operating a shipper lever 165 in which event the gear clutch member 164, as shown in Figure 3, is brought into cooperative relation with a pinion 166 driven by a gear 167 on the armature shaft of an electric motor 168. It is deemed unnecessary to describe in detail the clutching and de-clutching arrangement for the compressor A and electric motor 168, which is employed primarily in connection with precooling of the car, since the details of this construction are fully disclosed in said Luhr pending application, Serial No. 413,713.

With the planetary gearing construction just described, it is obvious that an automatic balancing of the operations of the two compressors A and B will be effected in accordance with the working requirements. When operation of the air compressor B is not required and the shut-off valve C is closed so as to prevent operation thereof, the inner shaft 147 will remain stationary and the power delivered through the pulley 127 will effect rotation of the outer shaft 128 and through the pinion 154, will drive the internal gear 157 and hence the refrigerant compressor A. When operation of the air compressor is desired and the shut-off valve C is open and operation of the refrigerant compressor A is not required, the internal gear 157 and its housing 144 remain stationary and power delivered through the pulley 127 is transmitted through the pinion 154 to the gear 158, thus driving the air compressor. As will also be understood, various intermediate conditions will take place wherein the power from the pulley 127 is distributed part to the compressor A and part to the compressor B, dependent upon the load requirements of the respective compressors. Also, particularly at the time of starting the car after a considerable period of rest, should there be any abnormal resistance to operation of the refrigerant compressor A due to accumulation of condensed refrigerant in the cylinders, the shock is dissipated by the power being transmitted to and operating the air compressor B since the air compressor system, even though the shut-off valve C is closed, will function as a cushioning medium permitting increased compression of the air in the system. Should the pressure in the shut-off air system rise beyond the pre-determined maximum, excess pressure is avoided through the safety valve 49. By thus employing a differential drive between and common to the two heating and refrigerating systems, the power from the axle is utilized in the most effective and efficient manner, depending upon the requirements prevailing at any time and also excessive stresses in the drives are avoided, as will be apparent from the foregoing.

As will be evident to those skilled in the art, the ratios of the gears 154, 157 and 158 will vary in accordance with the mean effective pressures and piston displacements of the two compressors A and B. In the drawings the air compressor B illustrated is of the single cylinder type and that of the refrigerant compressor A of the two cylinder type, both with the same piston displacements per cylinder, while the pitch diameters and teeth of the planetary gear system are approximately in the ratio of 3 for the internal gear 157, 1 for the gear 154 and 1 for the gear 158. With an assumed effective refrigerant compressor pressure of 150 pounds per square inch, the pressure would be 100 pounds per square inch for the air compressor. The rate at which the air is circulated through the air heating system may, as hereinbefore described, be varied for seasonal effects by adjustment of the needle valve of the pilot valve E.

From the preceding description, it will be seen that the arrangement provides for the utilization of all power for cooling purposes when this is desirable; the utilization of all power for heating purposes when this is desired; the distribution of the power for partly heating purposes and for accumulating cold in the brine tanks when this is desirable; control of the air circulation in the most effective manner depending upon requirements; and automatic control of all of the parts by temperature responsive means located in the pay-load compartment.

The invention has herein been described with particular reference to a refrigerator car but, as will be understood by those skilled in the art, the invention may be utilized in other propelled vehicles, such as passenger cars for conditioning the air of the passenger compartment. Also, while the preferred embodiment of the invention has been described in detail, nevertheless the same is by way of illustration only since it is evident that various changes and modifications may be made without departing from the spirit of the invention and also that certain features may be utilized alone as well as in combination. All such changes, variations and modifications are contemplated as come within the scope of the appended claims.

I claim:

1. In a railway car having a revenue-producing compartment, the combination with means for refrigerating said compartment, including a refrigerant compressor; of means for heating said compartment, including an air compressor; devices, common to both of said compressors for driving the same from a car axle, said devices including means for automatically distributing the power to the respective compressors in accordance with different load conditions.

2. In a railway car having a revenue-producing compartment, the combination with means for refrigerating said compartment, including a refrigerant compressor; of means for heating said compartment, including an air compressor; devices for driving both of said compressors from a car axle including a shaft on each compressor; an axle-driven element, and a compensating power-transmitting means operatively interposed between said element and the two compressor shafts.

3. In a railway car having a revenue-producing compartment, the combination with means for refrigerating said compartment including a refrigerant compressor; of means for heating said compartment, including a thermostatically governed air compressor system; and means, driven from a car axle, for driving each of said compressors selectively proportional to the heating and cooling requirements of said compartment under normal conditions of operation.

4. In a refrigerator car having a payload compartment, a refrigerating chamber within the body of the car and a heating chamber beneath the car body with communicating air passages between said compartment and each of said chambers, the combination with refrigerating means in the refrigerating chamber; of heat-producing and radiating means in the heating chamber including an axle driven compressor; and means for shutting off air circulation between said refrigerating chamber and compartment when the compressor of said heating means is being driven from the axle.

5. In a refrigerator car having a payload compartment, a cooling chamber and communicating air passages therebetween, the combination with a cold accumulator in said chamber; refrigerating means including an axle driven compressor in series with a condenser and an expansion coil located in said chamber; air heating means including an axle driven air compressor; valve means controlling said air passages; and temperature-responsive means governing the operation of said air compressor and also operatively associated with said valve means to govern the position of the latter.

6. In a refrigerator car having a payload compartment, a refrigerating chamber and a heating chamber with communicating air passages between the compartment and each of the chambers, the combination with a compressor-condenser-expander cooling means, the expander being located in said refrigerating chamber; of an air compressor, heat-producing and radiating system in said heating chamber; and means for automatically selectively driving either compressor from a car axle.

7. In a refrigerator car having a payload compartment, a refrigerating chamber and a heating chamber with communicating air passages between the compartment and each of the chambers, the combination with a compressor-condenser-expander cooling means, the expander being located in said refrigerating chamber; of an air compressor, heat-producing and radiating system in said heating chamber; and means for driving both compressors from a car axle, said means including load-governing, balancing power-distributing devices interposed between the compressors.

8. In a refrigerator car having a payload compartment, a refrigerating chamber and a heating chamber with communicating air passages between the compartment and each of the chambers, the combination with a compressor-condenser-expander cooling means, the expander being located in said refrigerating chamber; of an air compressor, heat-producing and radiating system in said heating chamber; means for driving both compressors from a car axle, said means including load-governing, balancing power-distributing devices interposed between the compressors; and temperature-responsive means governing said heating means.

9. In a refrigerator car having a payload compartment, a refrigerating chamber and a heating chamber with communicating air passages between said compartment and each chamber, the combination with a compressor-condenser-expander refrigerating system, the expander of which is disposed in said refrigerating chamber; of heating means disposed in said heating chamber and including an air compressor and a control valve in the compressed air circuit; valve means controlling the air passages between the compartment and refrigerating chamber; a compressed air motor for actuating said valves; temperature responsive means governing the operation of said control valve and through the latter, the air compressor system and air motor; and axle driven means for operating both compressors, said means including an automatically operable, power distributing device between the two compressors.

10. In a vehicle having a revenue-producing compartment, power actuated means for cooling air circulated through said compartment; power-actuated means for heating air circulated through said compartment; and means for transferring power derived from a movable part of the vehicle when in motion, to both said cooling and heating means and having included therein devices for automatically distributing the transfer of power to said cooling and heating means in accordance with different load conditions.

CARL W. SPOHR.